United States Patent [19]
Leek et al.

[11] Patent Number: 5,249,404
[45] Date of Patent: Oct. 5, 1993

[54] HOLDOWN CONNECTION

[75] Inventors: William F. Leek, Anaheim; Alfred D. Commins, Danville, both of Calif.

[73] Assignee: Simpson Strong-Tie Company, Inc., San Leandro, Calif.

[21] Appl. No.: 881,437

[22] Filed: May 11, 1992

[51] Int. Cl.$^5$ .............................................. E04B 1/38
[52] U.S. Cl. ..................................... 52/702; 403/190; 403/232.1; 182/87
[58] Field of Search ..................... 403/190, 230, 232.1; 52/702; 182/87; 29/897.3

[56] References Cited

U.S. PATENT DOCUMENTS

| 625,437 | 5/1899 | Stewart et al. | 52/702 |
| 666,918 | 1/1901 | Butz | 403/190 |
| 874,514 | 12/1907 | Lindow | 403/232.1 |
| 2,321,221 | 6/1943 | Linehan | 403/230 |
| 2,413,362 | 12/1946 | Maxwell et al. | 403/230 |
| 2,776,793 | 1/1957 | Nystrom | 29/897 |
| 4,665,672 | 5/1987 | Commins et al. | 52/702 |
| 4,825,621 | 5/1989 | Jensen | 52/702 |
| 5,092,097 | 3/1992 | Young | 52/702 |

OTHER PUBLICATIONS

Simpson Strong-Tie Company, Inc. catalog p. 13, copyright 1992.
Silver Metal Products catalog p. 9 copyright 1991.

Primary Examiner—James L. Ridgill, Jr.
Attorney, Agent, or Firm—James R. Cypher

[57] ABSTRACT

A holdown connection including a single element holdown connector formed from a single metal sheet member requiring no welding for connecting a wood stud member to an anchoring means such as a concrete foundation or another structural member. Three sides of the connector are joined at 90° to each other along a rigid corner bend line. A holding seat member overlaps with a held seat member so that a held edge of the held seat member is in close engagement with a substantial portion of the length of the rigid bend line of the holding seat member. Bending slots formed in the back and side members are limited in length.

7 Claims, 10 Drawing Sheets

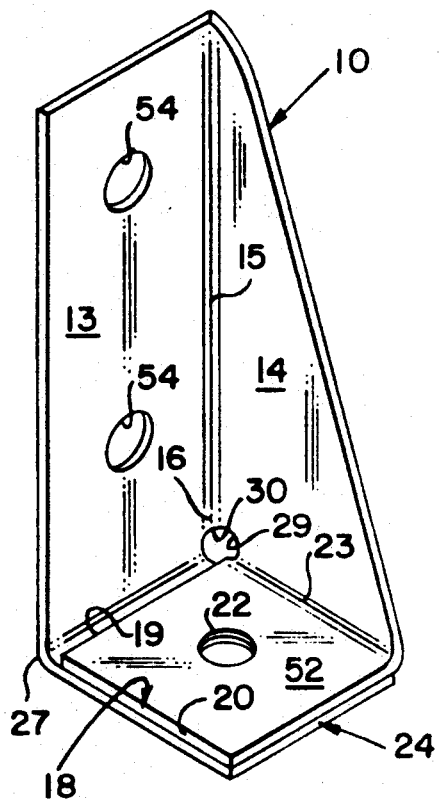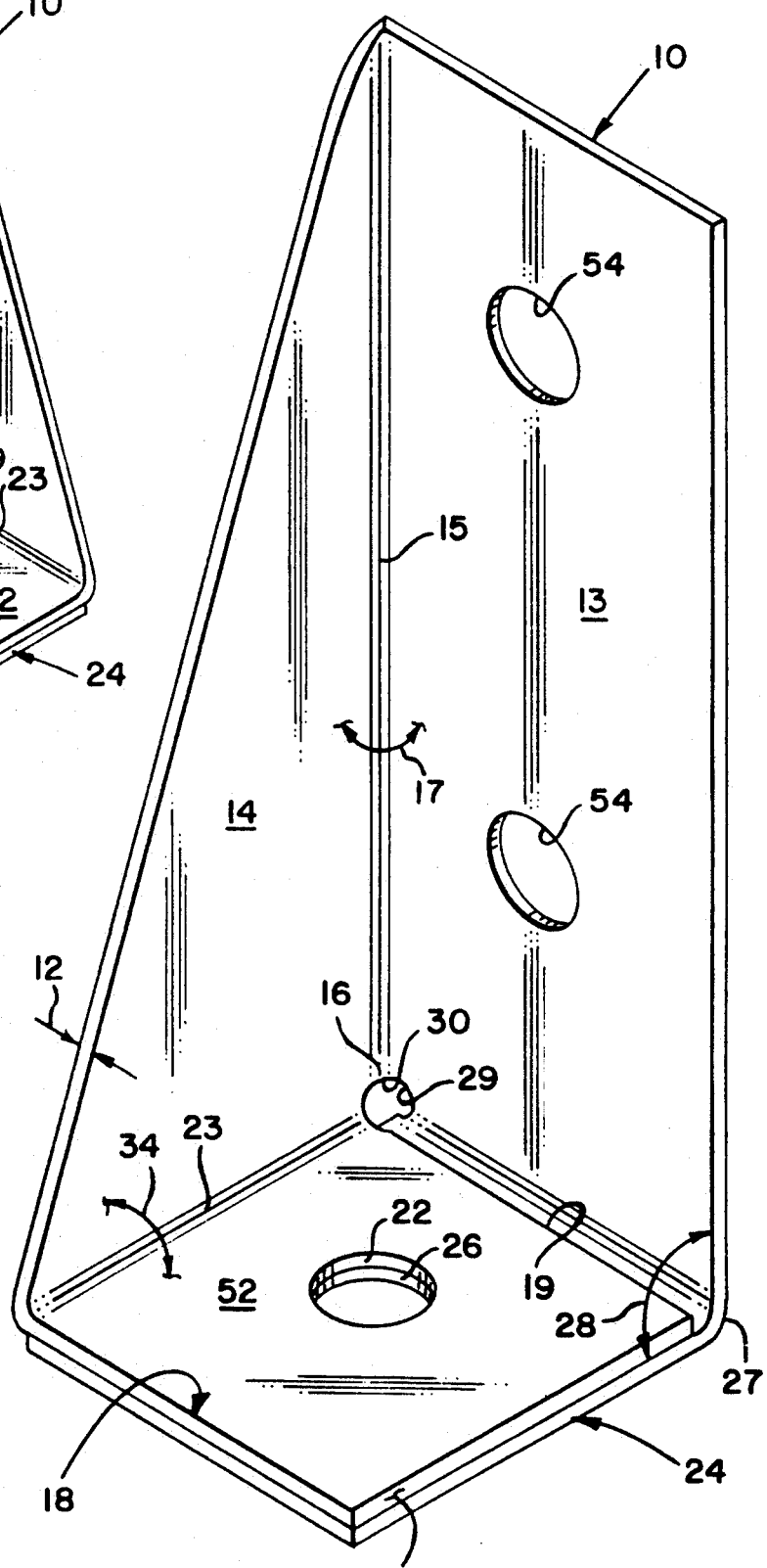

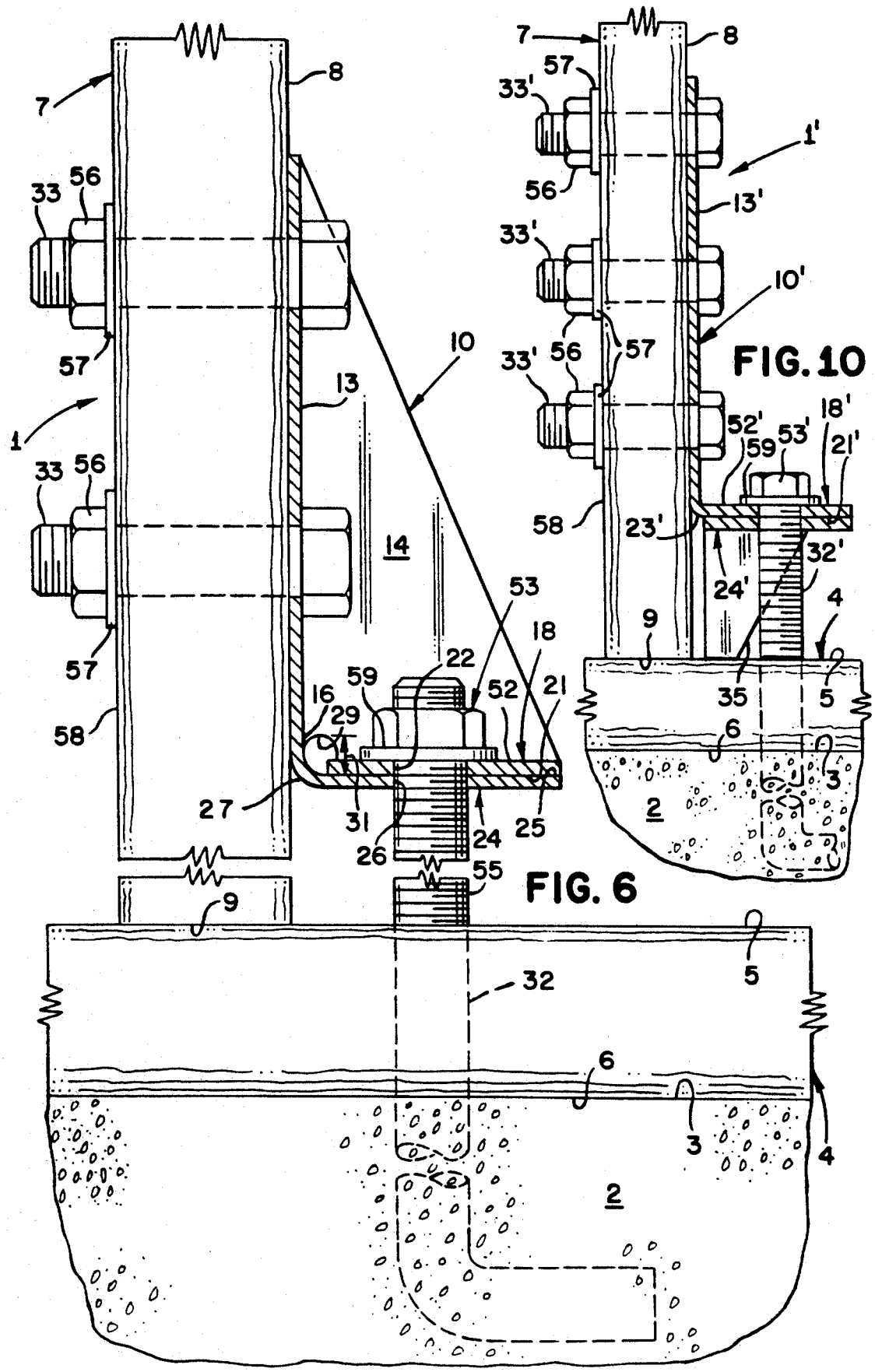

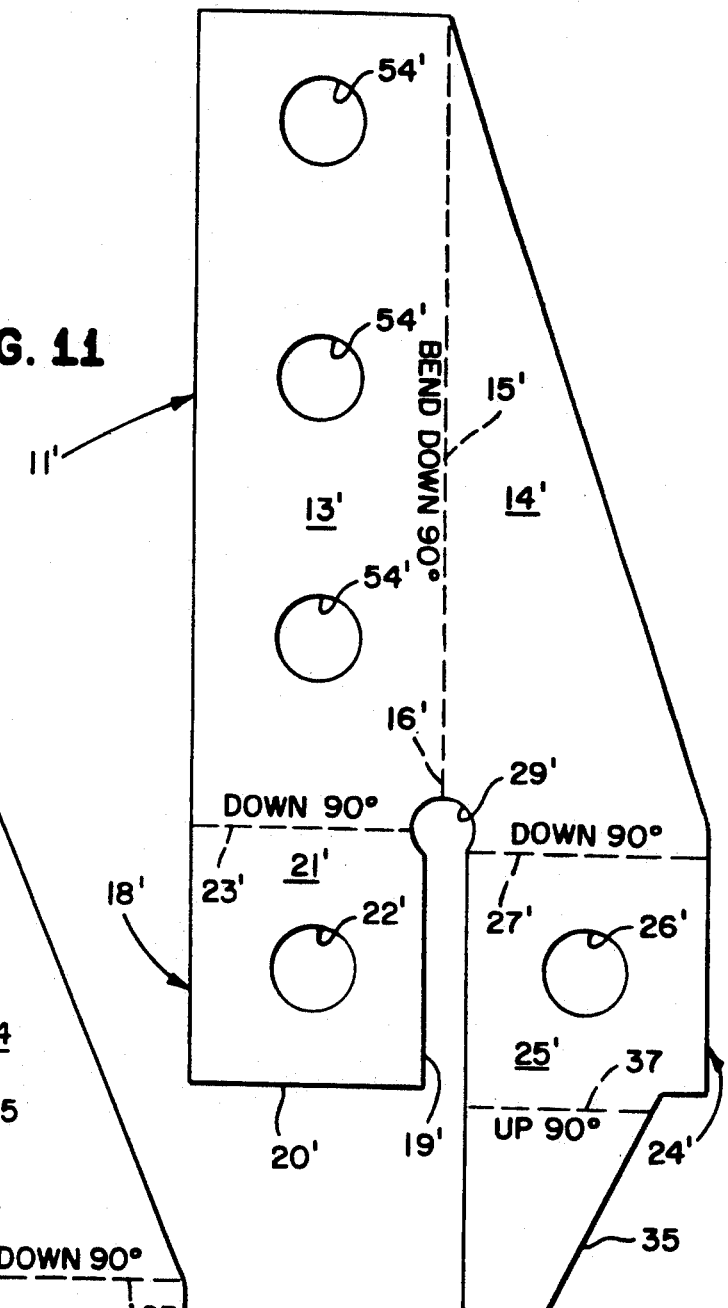
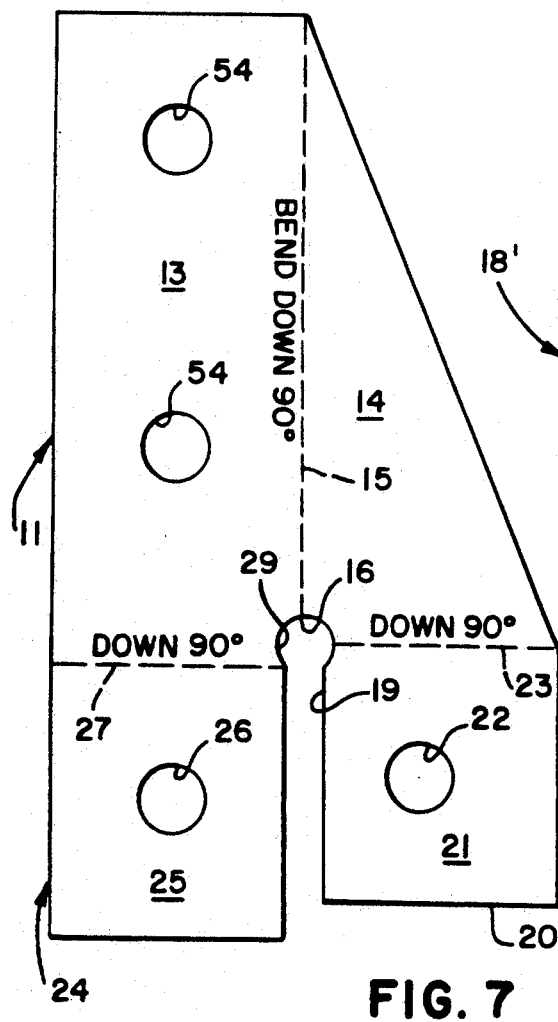
FIG. 11
FIG. 7

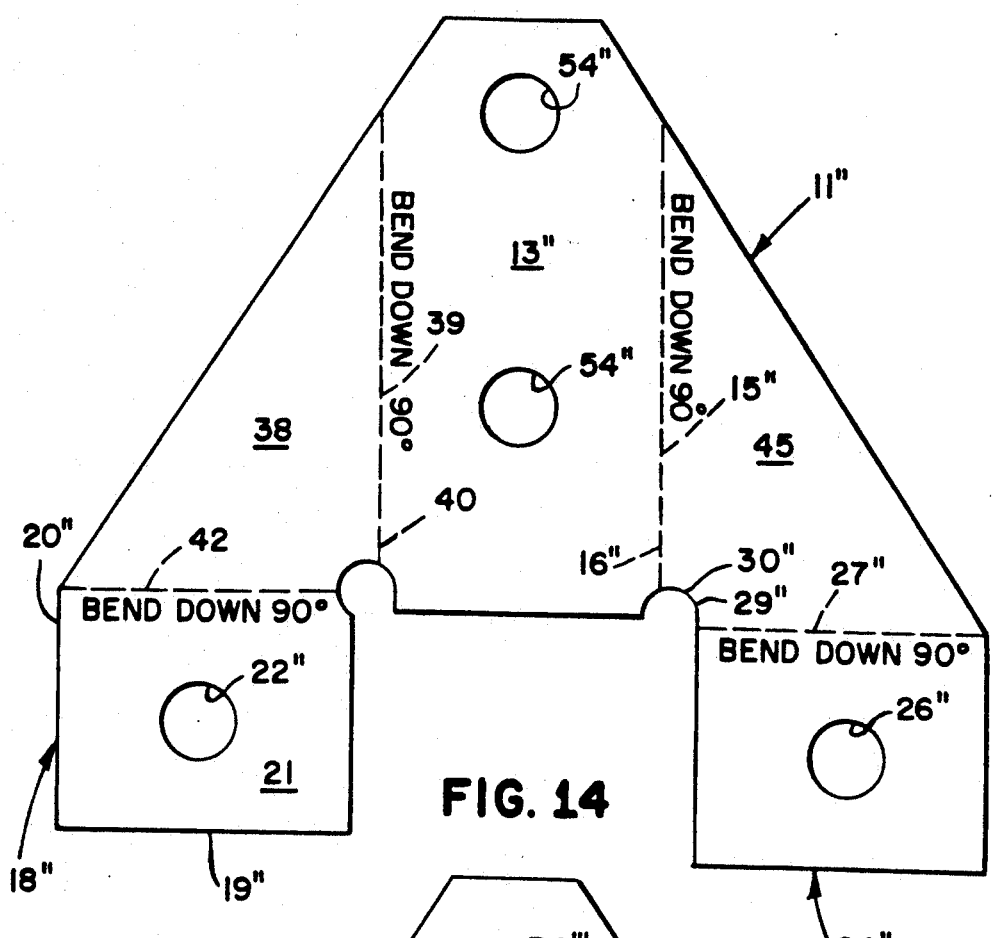
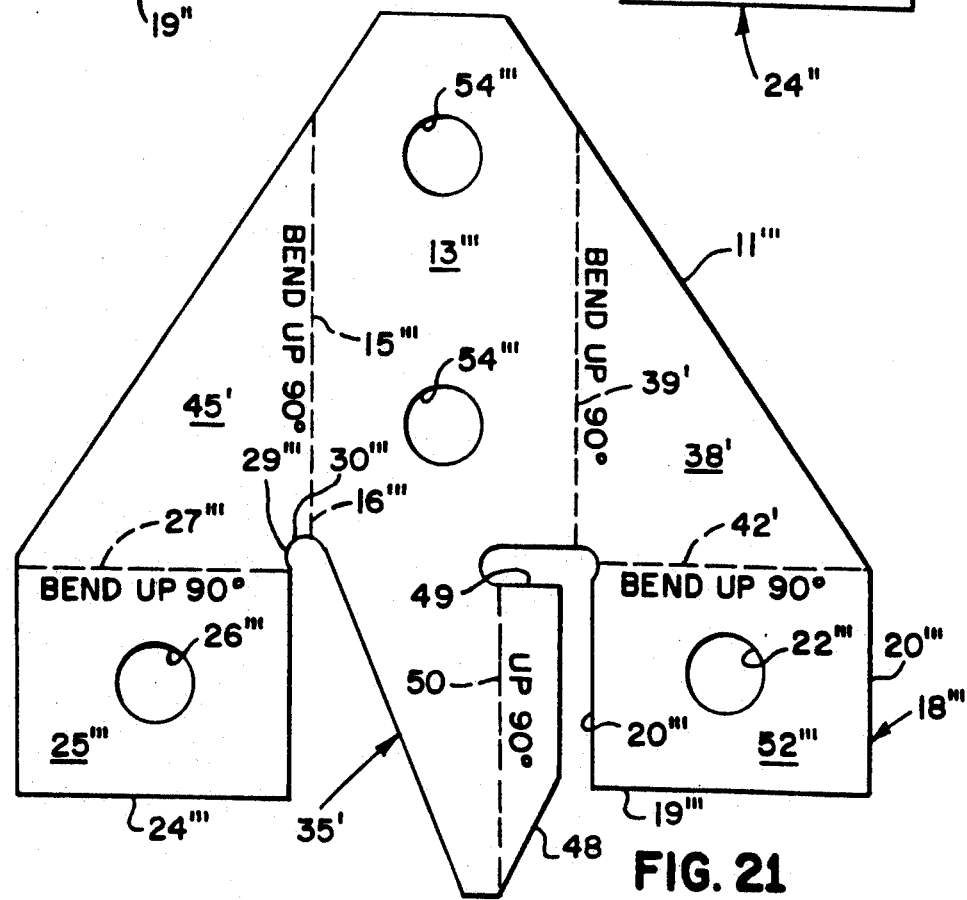

HOLDOWN CONNECTION

BACKGROUND

The present invention relates to a holdown connection, which includes a metal holdown connector for attaching wood framing studs and a mudsill or flooring to anchoring means such as floor joist, a concrete slab, or foundation wall.

Early holdowns were constructed from two or more separate pieces of metal welded together and painted to protect the holdown from rusting. The prior art teaches one piece holdowns which fall into two categories; viz. (1) overlapped back holdowns as exemplified by U.S. Pat. No. 4,665,672 granted to Commins, Gilb, and Littleton May 19, 1987, and (2) overlapped seat holdowns which are split into double overlapped seats as exemplified by Jensen, U.S. Pat. No. 4,825,621 May 2, 1989, and Young U.S. Pat. No. 5,092,097 granted Mar. 3, 1992, and triple overlapped seats as taught by Silver 1991 catalog page 9.

Holdown connections are required in many parts of the country subject to earthquakes, hurricanes and typhoons. They are an additional cost to standard construction practice and as such are subject to fierce competitive pricing.

An object of the present invention is to reduce both the cost of material used in the holdown, the cost of producing the holdown, and the cost of installation.

Reduction of cost is achieved by eliminating the need for welding and painting, eliminating the need for a separate rigid washer, and limiting the number of overlapped seats to two.

SUMMARY OF THE INVENTION

The objectives of this invention are met by taking advantage of a phenomenon termed herein as the "rigid corner effect". As used in this application, the "rigid corner effect" is defined as a phenomenon which occurs as a result of the juncture of three sides joined at generally right angles. The "rigid corner effect", as it is understood, is explained further under the heading "Operation of the holdown".

The present invention is a holdown connection including: anchoring means such as a floor joist member or a concrete foundation having an upper planar surface; transfer means such as a floor or a wood mudsill member having an upper planar surface and a lower planar surface in registration with the upper planar surface of the anchoring means; a wood stud member having a planar side face and a lower end in registration with the upper planar surface of the wood mudsill member or floor; a single element holdown connector formed from a single metal sheet member of a selected uniform thickness and formed by bending along substantially straight bend lines including: an elongated back member in registration with the planar side face of the wood stud member; a side member integrally connected to the elongated back member along a rigid corner bend line having a lower end and forming a generally 90° angle with the elongated back member; a held seat member having a generally straight held edge and having generally planar upper and lower surfaces and formed with a first anchor bolt opening and integrally connected to the side member along a bend line and forming a generally 90° angle with the side member; a holding seat member having a generally planar upper surface in registration with the lower surface of the held seat member and formed with a second anchor bolt opening in registration with the first anchor bolt opening integrally connected to the single element holdown connector along a rigid bend line and forming a generally 90° angle with the back member; and a bending slot having an upper end formed in the back member and the side member along the lower end of the rigid corner bend line having a length no greater than 2.5 times the thickness of the single side, single element holdown connector as measured from the upper surface of the holding seat member to the upper end of the bending slot; an anchor bolt dimensioned for close registration with the first and second anchor bolt openings and extending therethrough into the concrete foundation or floor joist a selected distance; the generally straight held edge of the held seat member is in close engagement with a substantial portion of the length of the rigid bend line; fastener means joining the back member to the wood stud member; and holding means releasably connected to the anchor bolt and positioned in registration with the generally planar upper surface of the held seat member.

BRIEF DESCRIPTION OF THE DRAWINGS

FIG. 1 is a perspective view of a single side, single element holdown connector constructed in accordance with the present invention.

FIG. 2 is an alternate construction of the single side, single element holdown connector illustrated in FIG. 1.

FIG. 6 is a side view of a holdown connection utilizing the single side, single element holdown connector illustrated in FIG. 2. Portions of the elements in the holdown connection have been cut away so that the holdown connection can be illustrated on one drawing sheet.

FIG. 7 is a sheet metal blank from which the single side, single element holdown connector illustrated in FIG. 1 is constructed.

FIG. 10 is a side view of a holdown connection using the single side, single element stand off holdown connector illustrated in FIG. 8.

FIG. 11 is a top plan view of a blank of sheet metal from which the single side, single element stand off holdown connector illustrated in FIG. 8 is constructed.

FIG. 14 is a top plan view of a blank of sheet metal from which the dual side, single element holdown connector illustrated in FIG. 12 is constructed.

FIG. 21 is a top plan view of a blank of sheet metal from which the dual side, single element stand off holdown connector illustrated in FIG. 15 is constructed.

DESCRIPTION OF THE PREFERRED EMBODIMENTS

Figure 3:
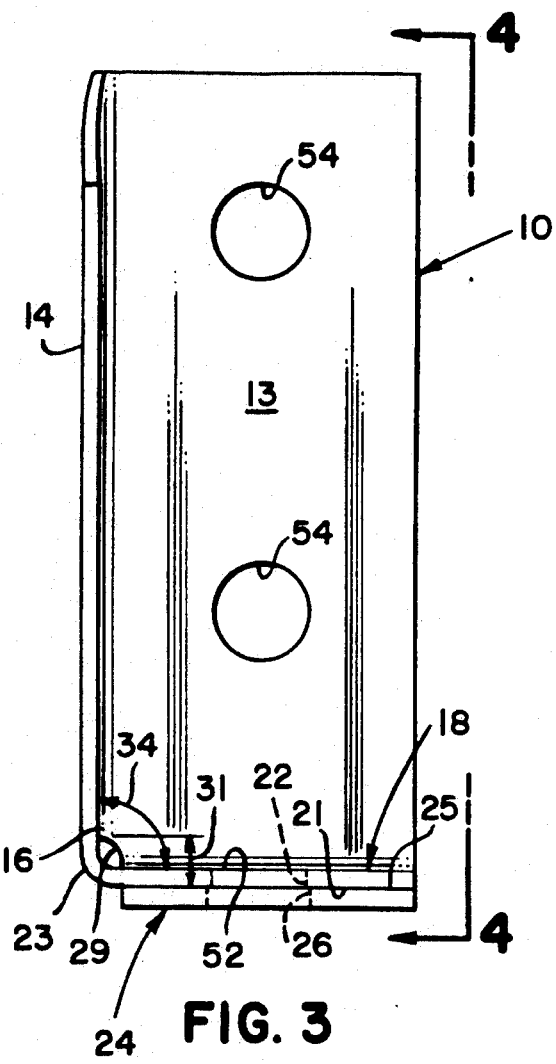
FIG. 3 is a front view of the single side, single element holdown connector illustrated in FIG. 1.
Figure 4:
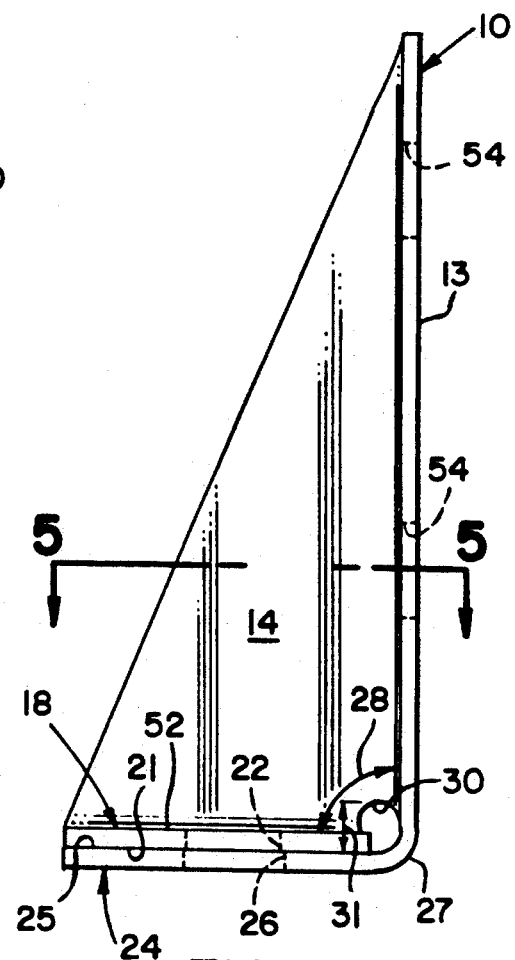
FIG. 4 is a side view of the single side, single element holdown connector illustrated in FIG. 1.
Figure 5:
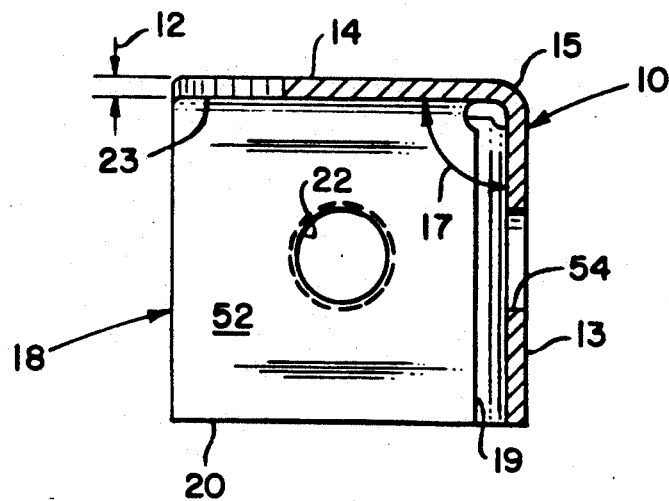
FIG. 5 is a top plan view of the single side, single element holdown connector illustrated in FIG. 1.
Figures 8, 9:
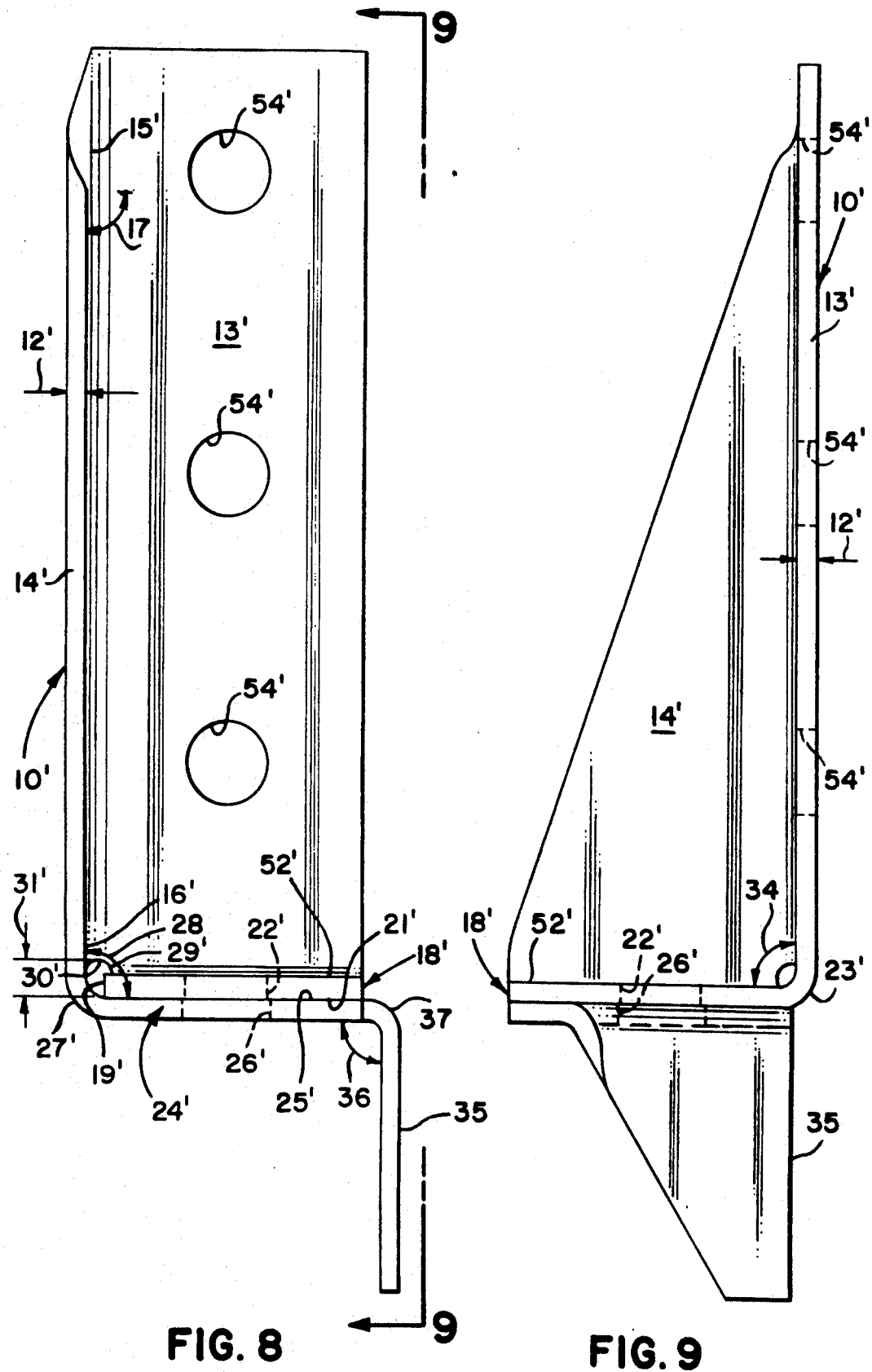
FIG. 8 is a front view of another form of the holdown connector designated a single side, single element stand off holdown connector.
FIG. 9 is a side view of the single side, single element stand off holdown connector illustrated in FIG. 8.

Referring to FIGS. 1-7, an embodiment of a holdown connection 1 of the present invention consists of: anchoring means such as a concrete foundation 2 having an upper planar surface 3; a transfer means such as a wood mudsill member 4 having an upper planar surface 5 and a lower planar surface 6 in registration with the upper planar surface 3 of the concrete foundation 2; a wood stud member 7 having a planar side face 8 and a lower end 9 in registration with the upper planar surface 5 of the wood mudsill member 4; a single side, single element holdown connector 10 formed from a single metal sheet member 11 of a selected uniform thickness 12 and formed by bending along substantially straight bend lines including: an elongated back member 13 in registration with the planar side face 8 of the wood stud member 7; a side member 14 integrally connected to the elongated back member 13 along a rigid corner bend line 15 having a lower end 16 and forming a generally 90° angle 17 with the elongated back member 13; a held seat member 18 having a generally straight held edge 19 and an end edge 20 and having generally planar upper and lower surfaces 52 and 21 and formed with a first anchor bolt opening 22 and integrally connected to the side member 14 along a bend line 23 and forming a generally 90° angle 34 with the side member 14; a holding seat member 24 having a generally planar upper surface 25 in registration with the lower surface 21 of the held seat member 18 and formed with a second anchor bolt opening 26 in registration with the first anchor bolt opening 22 integrally connected to the elongated back member 13 along a rigid bend line 27 and forming a generally 90° angle 28 with the back member 13; and a bending slot 29 having an upper end 30 formed in the back member 13 and the side member 14 along the lower end 16 of the rigid corner bend line 15 having a length 31 no greater than 2.5 times the thickness 12 of the single side, single element holdown connector 10 as measured from the upper surface 25 of the holding seat member 24 to the upper end 30 of the bending slot 29; an anchor bolt 32 dimensioned for close registration with the first and second anchor bolt openings 22 and 26 and extending therethrough to the other side of the anchoring means or into the concrete foundation 2 a selected distance; the generally straight held edge 19 of the held seat member 18 is in close engagement with a substantial portion of the length of the rigid bend line 27; fastener means 33 joining the back member 13 to the wood stud member 7; and holding means 53 releasably connected to the anchor bolt 32 and positioned in registration with the generally planar upper surface 52 of the held seat member 18.

Another embodiment of the present invention is illustrated in FIGS. 8, 9, 10, and 11 in which the holdown connection 1' includes: anchor means such as a concrete foundation 2 having an upper planar surface 3; transfer means such as a wood mudsill member 4 having an upper planar surface 5 and a lower planar surface 6 in registration with the upper planar surface 3 of the concrete foundation 2; a wood stud member 7 having a planar side face 8 and a lower end 9 in registration with the upper planar surface 5 of the wood mudsill member 4; a single side, single element stand off holdown connector 10' formed from a single metal sheet member 11' of a selected uniform thickness 12' and formed by bending along substantially straight bend lines including: an elongated back member 13' in registration with the planar side face 8 of the wood stud member 7; a side member 14' integrally connected to the elongated back member 13' along a rigid corner bend line 15' having a lower end 16' and forming a generally 90° angle 17 with the elongated back member 13'; a held seat member 18' having a generally straight held edge 19' and an end edge 20' and having generally planar upper and lower surfaces 52' and 21' and formed with a first anchor bolt opening 22' and integrally connected to the elongated back member 13' along a first bend line 23' and forming a generally 90° angle 34 with the back member 13'; a holding seat member 24' having a generally planar upper surface 25' in registration with the lower surface 21' of the held seat member 18' and formed with a second anchor bolt opening 26' in registration with the first bolt opening 22' integrally connected to the side member 14' along a rigid bend line 27' and forming a generally 90° angle 28 with the side member 14'; and a bending slot 29' having an upper end 30' formed in the side member 14' and the back member 13' along the lower end 16' of the rigid corner bend line 15' having a length 31' no greater than 2.5 times the thickness 12' of the single element holdown connector 10' as measured from the upper surface 25' of the holding seat member 24' to the upper end 30' of the bending slot 29'; a foot member 35 integrally connected to the holding seat member 24' at a generally 90° angle 36 along a second bend line 37 and extending to the upper planar surface 5 of the wood mudsill member 4; an anchor bolt 32' dimensioned for close registration with the first and second anchor bolt openings 22' and 26' and extending therethrough past said anchoring means or into the concrete foundation 2 a selected distance; the generally straight held edge 19' of the held seat member 18' is in close engagement with a substantial portion of the length of the rigid bend line 27'; fastener means 33' joining the back member 13' to the wood stud member 7; and holding means 53' releasably connected to the anchor bolt 32' and positioned in registration with the generally planar upper surface 52' of the held seat member 18'.

Figures 12, 13:
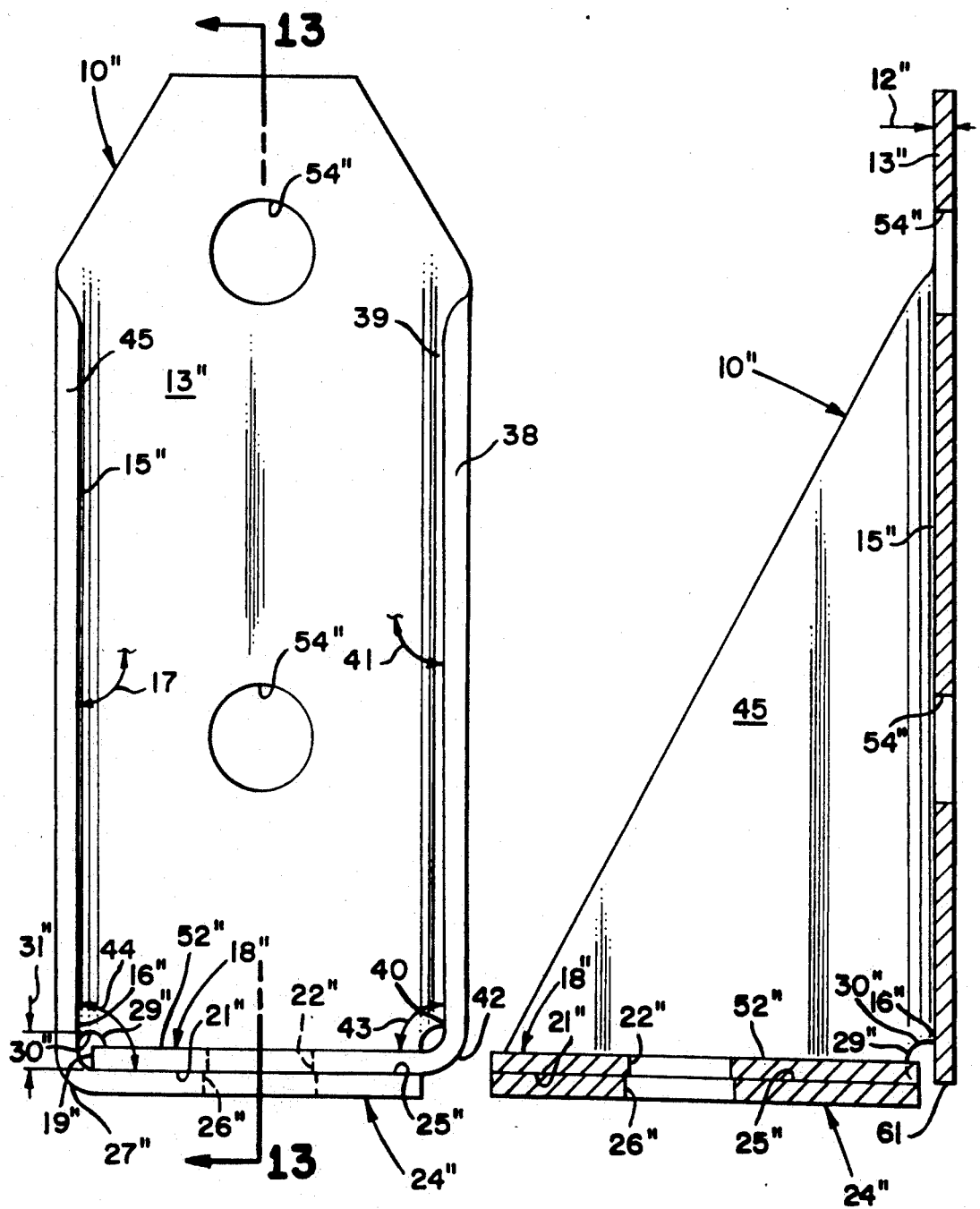
FIG. 12 is a front view of still another form of the invention designated herein as a dual side, single element holdown connector. For purposes of economy, the dual side, single element holdown connector is not separately illustrated in a particular connection. It is to be understood, however, that the dual side, single element holdown illustrated in FIG. 12 is part of and is connected to a concrete foundation and mudsill by a bolt and holding means and is connected to a vertical wood stud by fastener means as illustrated in FIG. 6.
FIG. 13 is a cross sectional view of the dual side, single element holdown connector illustrated in FIG. 12 and taken generally along line 13—13.
Figure 15:
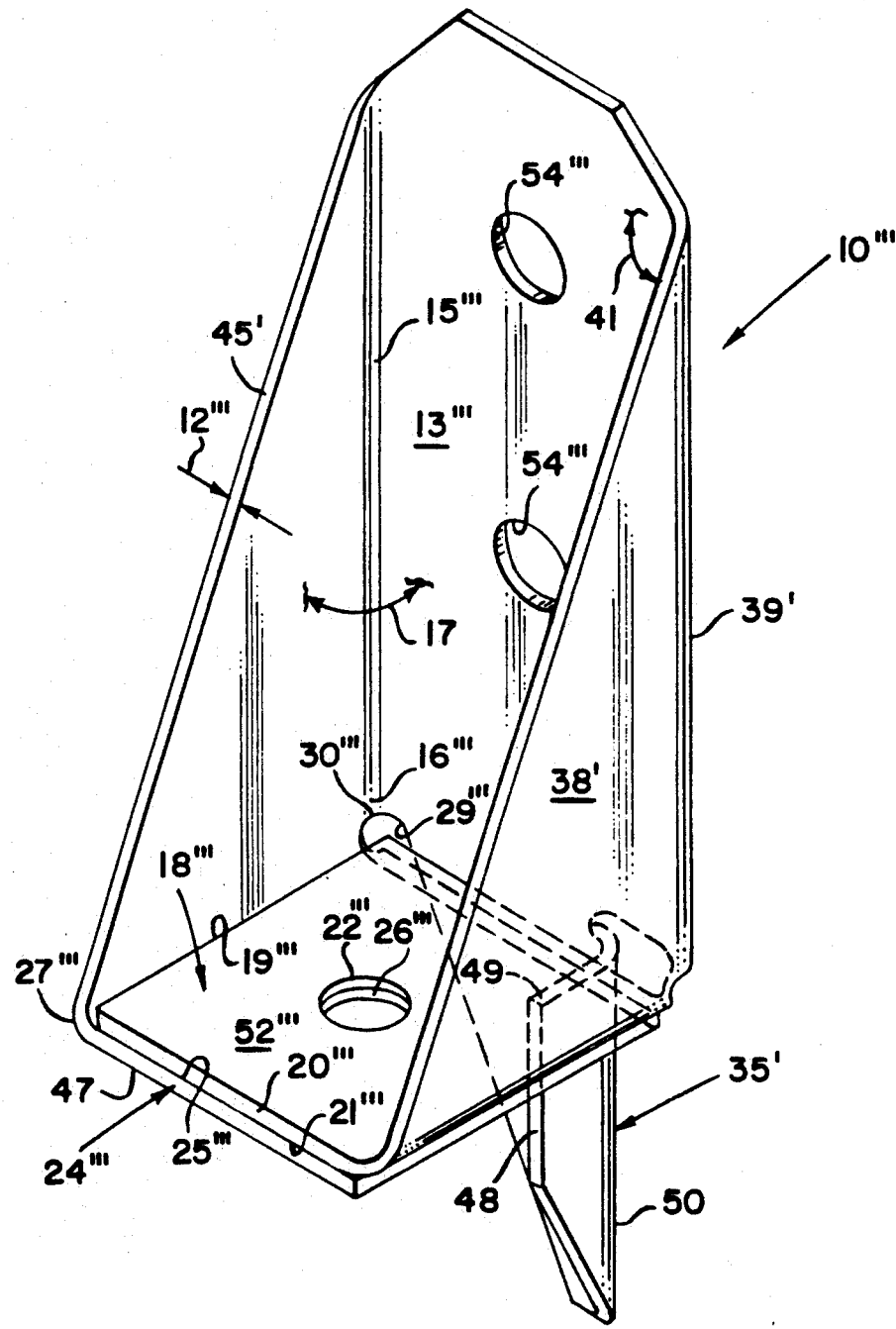
FIG. 15 is a perspective view of a further embodiment designated as a dual side, single element stand off holdown connector.
Figures 16, 17:
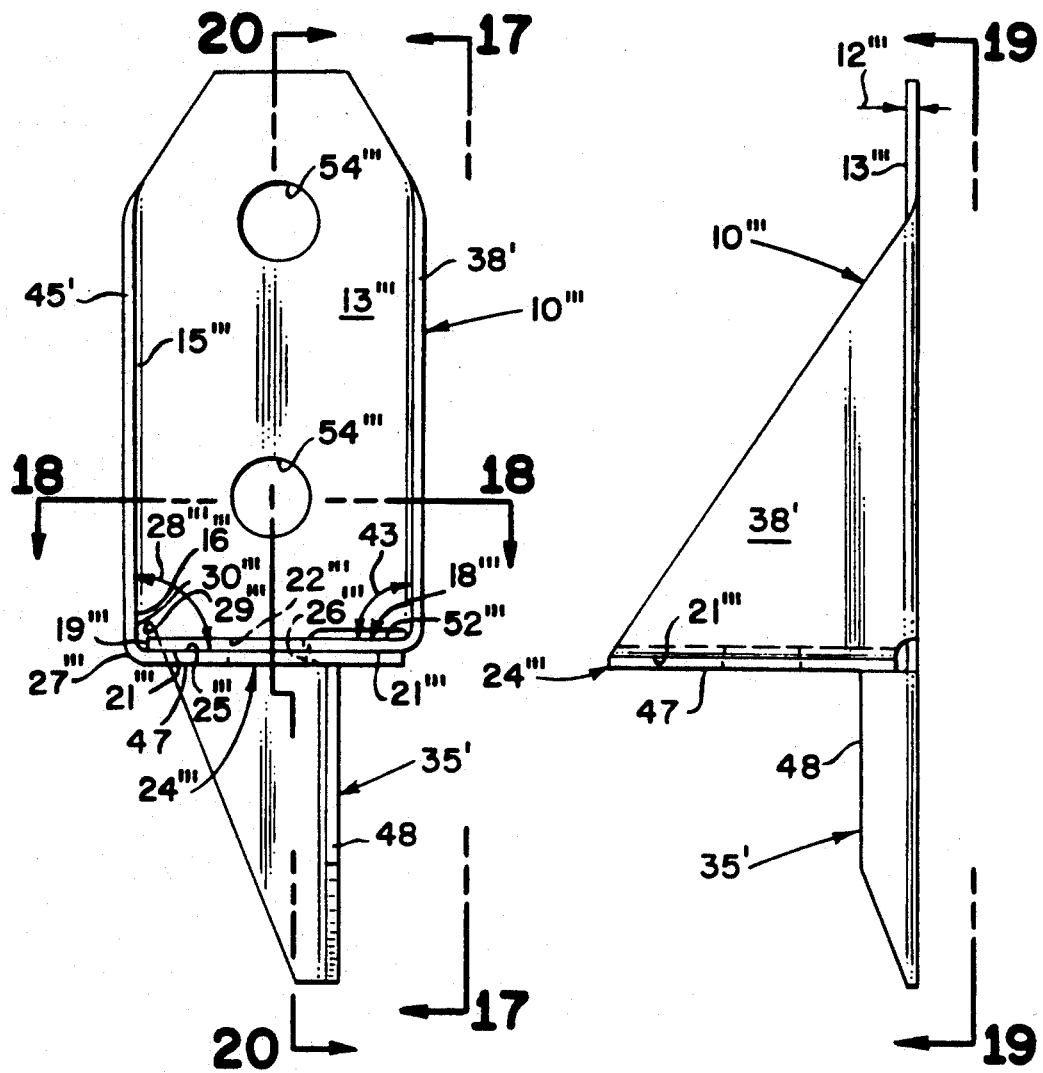
FIG. 16 is a front view of the dual side, single element stand off holdown connector illustrated in FIG. 15.
FIG. 17 is a side view of the dual side, single element stand off holdown connector illustrated in FIG. 15.
Figure 18:
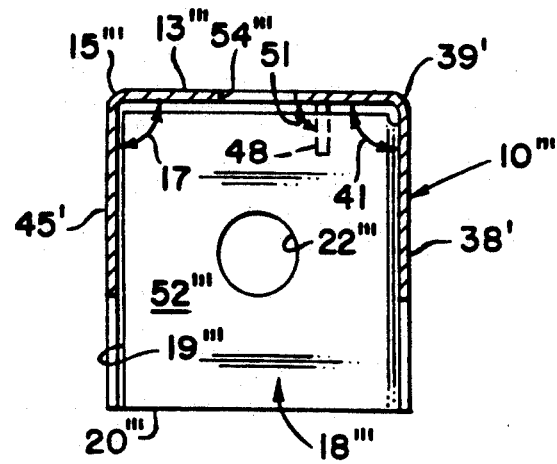
FIG. 18 is a top plan view of the dual side, single element stand off holdown connector illustrated in FIG. 15.
Figure 19:
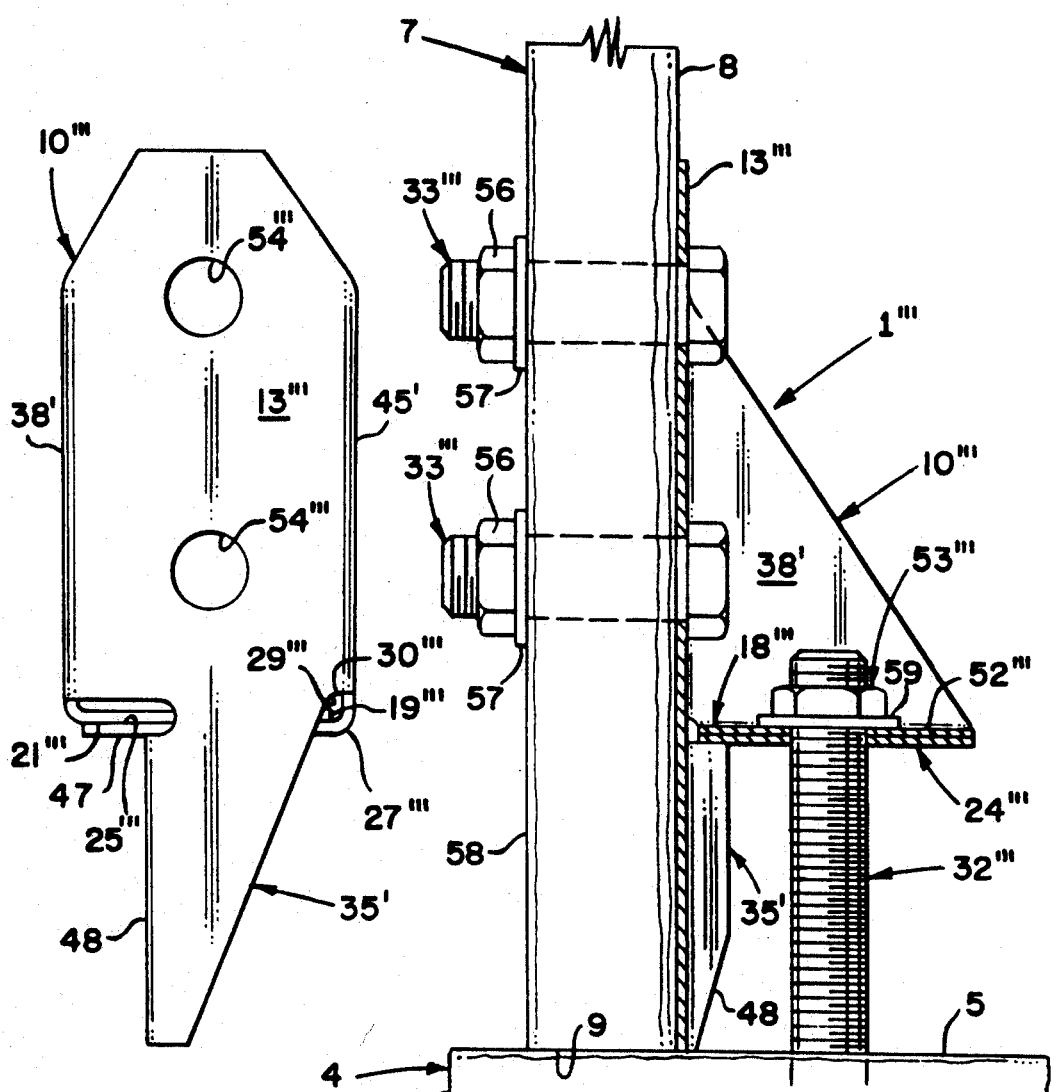
FIG. 19 is a rear view of the dual side, single element stand off holdown connector illustrated in FIG. 15.

Still another embodiment of the present invention is illustrated in FIGS. 12, 13, and 14. The dual side, single element holdown connector 10" illustrated in FIGS. 12, 13, and 14 is part of a holdown connection and operates in the same manner as the holdown connection 1 illustrated in FIG. 6. The holdown connection including holdown connector 10" also includes anchoring means such as a concrete foundation 2 having an upper planar surface 3; transfer means such as a wood mudsill member 4 having an upper planar surface 5 and a lower planar surface 6 in registration with the upper planar surface 3 of the concrete foundation 2; and a wood stud member 7 having a planar side face 8 and a lower end 9 in registration with the upper planar surface 5 of the wood mudsill member 4 which is the same as the elements illustrated in FIG. 6.

In addition, the dual side, single element holdown connector 10" illustrated in FIGS. 12-14 in the holdown connection is constructed from a single metal sheet member 11" of a selected uniform thickness 12" and formed by bending along substantially straight bend lines.

The dual side, single element holdown connector 10" includes: an elongated back member 13" in registration with the planar side face 8 of the wood stud member 7; a first side member 45 integrally connected to the elongated back member 13" along a rigid corner bend line 15" having a lower end 16" and forming a generally 90° angle 17 with the elongated back member 13"; a second side member 38 integrally connected to the elongated back member 13" along a first bend line 39 having a lower end 40 and forming a generally 90° angle 41 with the elongated back member 13": a held seat member 18" having a generally straight held edge 19" and an end edge 20" and having generally planar upper and lower surfaces 52" and 21" and formed with a first anchor bolt opening 22" and integrally connected to the second side member 38 along a second bend line 42 and forming a generally 90° angle 43 with the second side member 38; a holding seat member 24" having a generally planar upper surface 25" in registration with the lower surface 21" of the held seat member 18" and formed with a second anchor bolt opening 26" in registration with the first bolt opening 22" integrally connected to the first side member 45' along a rigid bend line 27" and forming a generally 90° angle 44 with the first side member 45; and a bending slot 29" having an upper end 30" formed in the back member 13" and the first side member 45 along the lower end 16" of the rigid corner bend line 15" having a length 31" no greater than 2.5 times the thickness 12" of the dual side single element holdown connector 10" as measured from the upper surface 25" of the holding seat member 24" to the upper end 30" of the bending slot 29; an anchor bolt 32" dimensioned for close registration with the first and second anchor bolt openings 22" and 26" and extending therethrough past the anchoring means or into the concrete foundation 2 a selected distance; the generally straight held edge 19" of the held seat member 18" is in close engagement with a substantial portion of the length of the rigid bend line 27"; fastener means 33" (not shown) joining the back member 13" to the wood stud member 7; and holding means 53" releasably connected to the anchor bolt 32" (not shown) and positioned in registration with the generally planar upper surface 52" of the held seat member 18".

It is to be noted that end 61 of elongated back member 13" extends to a point generally in the same plane as upper surface 25" of holding seat member 24.

Still another form of the invention is illustrated in FIGS. 15-21 in which holdown connection 1''' includes: anchoring means such as a concrete foundation 2 having an upper planar surface 3; transfer means such as a wood mudsill member 4 having an upper planar surface 5 and a lower planar surface 6 in registration with the upper planar surface 3 of the concrete foundation 2; a wood stud member 7 having a planar side face 8 and a lower end 9 in registration with the upper planar surface 5 of the wood mudsill member 4; a dual side, single element stand off holdown connector 10''' formed from a single metal sheet member 11''' of a selected uniform thickness 12''' and formed by bending along substantially straight bend lines including: an elongated back member 13''' in registration with the planar side face 8 of the wood stud member 7; a first side member 45' integrally connected to the elongated back member 13''' along a rigid corner bend line 15''' having a lower end 16''' and forming a generally 90° angle 17 with the elongated back member 13''' a second side member 38' integrally connected to the elongated back member 13''' along a first bend line 39' and forming a generally 90° angle 41 with the elongated back member 13''' a held seat member 18''' having a generally straight held edge 19''' and an end edge 20''' and having generally planar upper and lower surfaces 52''', and 21''' and formed with a first anchor bolt opening 22''' and integrally connected to the second side member 38' along a second bend line 42' and forming a generally 90° angle 43 with the second side member 38'; a holding seat member 24''' having a generally planar lower surface 47 and a generally planar upper surface 25''' in registration with the lower surface 21''' of the held seat member 18''' and formed with a second anchor bolt opening 26''' in registration with the first bolt opening 22''' integrally connected to the first side member 45 along a rigid bend line 27''' and forming a generally 90° angle 28''' with the first side member 45'; and a bending slot 29''' having an upper end 30''' formed in the back member 13''' and the first side member 45' along the lower end 16''' of the rigid corner bend line 15''' having a length no greater than 2.5 times the thickness 12''' of the dual side, single element stand off holdown connector 10''' as measured from the upper surface 25''' of the holding seat member 24''' to the upper end 30''' of the bending slot 29'''; a foot member 35' integrally connected to the elongated back member 13''' and extending to the upper planar surface 5 of the wood mudsill member 4; an anchor bolt 32''' dimensioned for close registration with the first and second anchor bolt openings 22''', and 26''' and extending therethrough past the anchoring means or into the concrete foundation 2 a selected distance; the generally straight held edge 19''' of the held seat member 18''' is in close engagement with a substantial portion of the length of the rigid bend line 27'''; fastener means 33''' joining the back member 13''' to the wood stud member 7; and holding means 53''' releasably connected to the anchor bolt 32''' and positioned in registration with the generally planar upper surface 52''' of the held seat member 18'''.

Preferably, foot member 35' is formed with a foot extension 48 having an upper edge 49 and is integrally connected to the foot member 35' along a third bend line 50 forming an angle 51 therewith; and the upper edge 49 of the foot extension 48 is dimensioned and located in registration with the lower surface 47 of the holding seat member 24'''.

If some instances, the elongated back member 13''' need not be formed with openings as the fastener may be inserted through the metal and into the wood stud by some form of impact or gun nailing device. In most instances, however, it is preferable to form the elongated back member 13''' with a plurality of bolt openings 54''' dimensioned for close fitting registration with the fastener means 33''' joining the back member 13''' to the wood stud member 7.

Operation of the holdown connections

Holdowns are used to transfer tension loads between floors, to tie purlins to masonry or concrete as well as to tie studs and mudsills to concrete foundations as illustrated. All holdowns by code require a minimum seven bolt diameter spacing from the end of the wood member being held.

Referring to FIGS. 1–6, and especially FIG. 6, anchor bolt 32 is first embedded in the wet concrete and after the concrete has set, an opening is drilled in the mudsill 4 and bolt 32 is inserted therethrough with the threaded portion 55 exposed above the top surface 5 of the wood mudsill 4. The selected height above the wood mud sill is measured and bolt holes are drilled in stud 6. The single side, single element holdown connector 10 is then positioned so that bolt 32 is inserted through second anchor bolt opening 26 in holding seat member 24 and first anchor bolt opening 22 formed in held seat member 18. Fastener means such as bolts 33 are than inserted through bolt openings 54 in elongated back member 13 and tightened until nuts 56 press washers 57 tightly against rear face 58 of wood stud member 7.

In some installations, the anchor bolt 32 may be replaced with a straight bolt with threads on both ends. Instead of the bolt being placed in a concrete foundation, the bolt may be sized to extend through a floor joist with attachment to either the bottom of the floor joist or to a wall stud on the other side of the floor joist using a second single side, single element holdown connector 10.

During periods of seismic rest or low wind loads imposed by hurricanes or typhoons, the holdown connector illustrated in FIG. 6 has no function. When however, an earthquake, hurricane, or typhoon imposes lateral or vertical loads, the holdown connection 1 operates in the following manner. When the forces are upwardly on stud member 7, upward load is transferred through fastener means 33 to elongated back member 13, and to holding seat member 24. Upward load is also transferred through side member 14 to held seat member 18. The upward force on both held seat member 18 and holding seat member 24 is transferred to anchor bolt 32 through nut 53 and washer 59.

"Rigid Corner Effect"

The "rigid corner effect" as set forth earlier is believed to be the key to the fundamentally different result effected by the present holdown connection. As previously mentioned, the present holdown connection requires that the metal connector only have a double overlapped seat instead of a triple seat. Further, no separate special locking washer is required.

The "rigid corner effect" as previously stated occurs as a result of the juncture of three sides joined at generally right angles. In the structure shown in FIGS. 1–7. The three "sides" include back member 13 joined to side member 14 along rigid corner bend line 15 at a generally 90° angle 17, and holding seat member 24 joined to back member 13 along rigid bend line 27 at a generally 90° angle 28. The "rigid corner effect" is only maintained, however, where bending slot 29 is minimized so that it is no greater than 2.5 times the thickness 12 of the single side, single element holdown connector 10 as measured from the upper surface 25 of the holding seat member 24 to the upper end 30 of the bending slot 29.

The purpose of the "rigid corner effect" is to cause rigid bend line 27 which is formed by the 90° angle 28 intersection of elongated back member 13 and holding seat member 24 to have an inordinate ability to resist unbending during periods of upward force occasioned by earthquakes, hurricanes, and typhoons. Equally important is the placement of generally straight held edge 19 of held seat member 18 as closely adjacent as possible to rigid bend line 27. Thus the resistance of holding seat 24 to unfolding under upward forces and particularly to the concentrated resistance to unbending at rigid bend line 27, provides great resistance to unbending of held seat member 18 because of the mechanical advantage due to the long lever arms of rigid bend line 27 and generally straight held edge 19. Thus the interaction of holding seat 24 and held seat member 18 due to their geometrical overlapping adds to the unexpectedly large holding force of the single side, single element holdown connector 10.

The single side, single element holdown connector 10 illustrated in FIGS. 1–7 is known commercially as a Simpson HD2 and is preferably constructed from 7 gauge metal sheet material which after folding makes a connector having a width of 2 ½", a height of 5 ¾" and a depth of 2 ½". Anchor bolt 32 has a diameter of ⅝" and the fastener means 33 stud bolts have a length of 2" and a diameter of ⅝".

Average ultimate loads are listed as 10,916 pounds. Allowable loads depend upon the length of the fastener means bolts in the wood member. For example for a bolt length of 1 ½" in the wood member, the allowable load is 1965 pounds. If the length of bolt in the wood member is 5 ½", the allowable load is 3,315 pounds.

Installation of single side, single element stand off holdown connector

Referring to FIGS. 8–11, installation of the single side, single element stand off holdown connector is as follows: anchor bolt 32' is first embedded in the wet concrete and after the concrete has set, an opening is drilled in the mudsill 4 and bolt 32' is inserted therethrough with the threaded portion exposed above the top surface 5 of the wood mudsill 4. Foot member 35 is dimensioned so that the correct height of the bolt openings 54' are automatically set above the lower end 9 of generally vertical stud member 7.

The "rigid corner effect" for the single side, single element stand off holdown connector illustrated in FIGS. 8–11 is the result of the joinder at 90° angles of elongated back member 13' to side member 14' along rigid corner bend line 15 and holding seat member 24' along rigid bend line 27. The "rigid corner effect" causes rigid bend line 27' to have an inordinate ability to resist unbending during periods of upward force. It is essential that bending slot 29' have a length no greater than 2.5 times the thickness 12' of the single element holdown connector 10' as measured from the upper surface 25' of the holding seat member 24' to the upper end 30' of the bending slot 29'.

Placement of generally straight held edge 19' of held seat member 18' must be as closely adjacent as possible to rigid bend line 27'.

Installation of dual side, single element holdown connector

Referring to FIGS. 12-14, installation of the dual side, single element holdown connector is the same as for the single side, single element holdown connector as illustrated in FIG. 6 and is not repeated.

The "rigid corner effect" for the dual side, single element holdown connector 10" is the result of the joinder at 90° angles of elongated back member 13" to first side member 45 along rigid corner bend line 15", and holding seat member 24" along rigid bend line 27". The "rigid corner effect" causes rigid bend line 27" to have an inordinate ability to resist unbending during periods of upward force. It is essential that bending slot 29" have a length no greater than 2.5 times the thickness 12" of the single element holdown connector 10" as measured from the upper surface 25" of the holding seat member 24" to the upper end 30" of the bending slot 29". Placement of generally straight held edge 19" of held seat member 18" must be as closely adjacent as possible to rigid bend line 27".

Installation of dual side, single element stand off holdown connector

Figure 20:
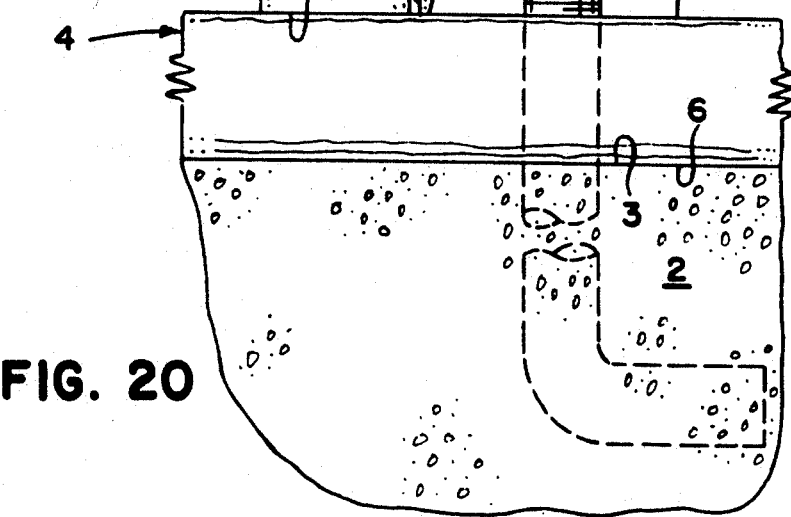
FIG. 20 is a side view of the holdown connection using the dual side, single element stand off holdown connector illustrated in FIG. 15.

Referring to FIGS. 15-21, installation of the dual side, single element stand off holdown connector is illustrated in FIG. 20 and is as follows: anchor bolt 32''' is first embedded in the wet concrete and after the concrete has set, an opening is drilled in the mudsill 4 and bolt 32''' is inserted therethrough with the threaded portion exposed above the top surface 5 of the wood mudsill 4. Foot member 35' is dimensioned so that the correct height of the bolt openings 54''' are automatically set above the lower end 9 of stud member 7.

The "rigid corner effect" for the dual side, single element stand off holdown connector 10''' is the result of the joinder at 90° angles of elongated back member 13''' to first side member 45' along rigid corner bend line 15''', and holding seat member 24''' along rigid bend line 27'''. The "rigid corner effect" causes rigid bend line 27''' to have an inordinate ability to resist unbending during periods of upward force.

It is essential that bending slot 29''' have a length no greater than 2.5 times the thickness 12''' of the single element holdown connector 10''' as measured from the upper surface 25''' of the holding seat member 24''' to the upper end 30''' of the bending slot 29'''. Placement of generally straight held edge 19''' of held seat member 18''' must be as closely adjacent as possible to rigid bend line 27'''.

We claim:

1. A holdown connection comprising:
   a. anchoring means having an upper planar surface;
   b. a transfer means having an upper planar surface and a lower planar surface in registration with said upper planar surface of said anchoring means;
   c. a wood stud member having a planar side face and a lower end in registration with said upper planar surface of said transfer means;
   d. a single element holdown connector formed from a single metal sheet member of a selected uniform thickness and formed by bending along substantially straight bend lines including:
      (1) an elongated back member in registration with said planar side face of said wood stud member;
      (2) a side member integrally connected to said elongated back member along a rigid corner bend line having a lower end and forming a generally 90° angle with said elongated back member;
      (3) a held seat member having a generally straight held edge and having generally planar upper and lower surfaces and formed with a first anchor bolt opening and integrally connected to said side member along a bend line and forming a generally 90° angle with said side member;
      (4) a holding seat member having a generally planar upper surface in registration with said lower surface of said held seat member and formed with a second anchor bolt opening in registration with said first anchor bolt opening integrally connected to said single element holdown connector along a rigid bend line and forming a generally 90° angle with said back member; and
      (5) a bending slot having an upper end formed in said back member and said side member along said lower end of said rigid corner bend line having a length no greater than 2.5 times said thickness of said single side, single element holdown connector as measured from said upper surface of said holding seat member to said upper end of said bending slot;
   e. an anchor bolt dimensioned for close registration with said first and second anchor bolt openings and extending therethrough into said anchoring means a selected distance;
   f. said generally straight held edge of said held seat member is in close engagement with a substantial portion of the length of said rigid bend line;
   g. fastener means joining said back member to said wood stud member; and
   h. holding means releasably connected to said anchor bolt and positioned in registration with said generally planar upper surface of said held seat member.

2. A holdown connection comprising:
   a. anchoring means having an upper planar surface;
   b. a transfer means having an upper planar surface and a lower planar surface in registration with said upper planar surface of said anchoring means;
   c. a wood stud member having a planar side face and a lower end in registration with said upper planar surface of said transfer means;
   d. a single side, single element holdown connector formed from a single metal sheet member of a selected uniform thickness and formed by bending along substantially straight bend lines including:
      (1) an elongated back member in registration with said planar side face of said wood stud member;
      (2) a side member integrally connected to said elongated back member along a rigid corner bend line having a lower end and forming a generally 90° angle with said elongated back member;
      (3) a held seat member having a generally straight held edge and an end edge and having generally planar upper and lower surfaces and formed with a first anchor bolt opening and integrally connected to said side member along a bend line and forming a generally 90° angle with said side member;
      (4) a holding seat member having a generally planar upper surface in registration with said lower surface of said held seat member and formed with a second anchor bolt opening in registration with said first anchor bolt opening integrally connected to said elongated back member along a rigid bend line and forming a generally 90° angle with said back member; and (5) a bending slot having an upper end formed in said back member and said side member along said lower end of said rigid corner bend line having a length no greater than 2.5 times said thickness of said single side, single element holdown connector as measured from said upper surface of said holding seat member to said upper end of said bending slot;

e. an anchor bolt dimensioned for close registration with said first and second anchor bolt openings and extending therethrough into said anchoring means a selected distance;

f. said generally straight held edge of said held seat member is in close engagement with a substantial portion of the length of said rigid bend line;

g. fastener means joining said back member to said wood stud member; and h. holding means releasably connected to said anchor bolt and positioned in registration with said generally planar upper surface of said held seat member.

3. A holdown connection comprising:
   a. anchoring means having an upper planar surface;
   b. a transfer means having an upper planar surface and a lower planar surface in registration with said upper planar surface of said anchoring means;
   c. a wood stud member having a planar side face and a lower end in registration with said upper planar surface of said transfer means;
   d. a single side, single element stand off holdown connector formed from a single metal sheet member of a selected uniform thickness and formed by bending along substantially straight bend lines including:
      (1) an elongated back member in registration with said planar side face of said wood stud member;
      (2) a side member integrally connected to said elongated back member along a rigid corner bend line having a lower end and forming a generally 90° angle with said elongated back member;
      (3) a held seat member having a generally straight held edge and an end edge and having generally planar upper and lower surfaces and formed with a first anchor bolt opening and integrally connected to said elongated back member along a first bend line and forming a generally 90° angle with said back member;
      (4) a holding seat member having a generally planar upper surface in registration with said lower surface of said held seat member and formed with a second anchor bolt opening in registration with said first bolt opening integrally connected to said side member along a rigid bend line and forming a generally 90° angle with said side member; and
      (5) a bending slot having an upper end formed in said side member and said back member along said lower end of said rigid corner bend line having a length no greater than 2.5 times said thickness of said single element holdown connector as measured from said upper surface of said holding seat member to the upper end of said bending slot;
      (6) a foot member integrally connected to said holding seat member at a generally 90° angle along a second bend line and extending to said upper planar surface of said transfer means;

e. an anchor bolt dimensioned for close registration with said first and second anchor bolt openings and extending therethrough into said anchoring means a selected distance;
   f. said generally straight held edge of said held seat member is in close engagement with a substantial portion of the length of said rigid bend line;
   g. fastener means joining said back member to said wood stud member; and
   h. holding means releasably connected to said anchor bolt and positioned in registration with said generally planar upper surface of said held seat member.

4. A holdown connection comprising:
   a. anchoring means having an upper planar surface;
   b. a transfer means having an upper planar surface and a lower planar surface in registration with said upper planar surface of said anchoring means;
   c. a wood stud member having a planar side face and a lower end in registration with said upper planar surface of said transfer means;
   d. a dual side, single element holdown connector formed from a single metal sheet member of a selected uniform thickness and formed by bending along substantially straight bend lines including:
      (1) an elongated back member in registration with said planar side face of said wood stud member;
      (2) a first side member integrally connected to said elongated back member along a rigid corner bend line having a lower end and forming a generally 90° angle with said elongated back member;
      (3) a second side member integrally connected to said elongated back member along a first bend line having a lower end and forming a generally 90° angle with said elongated back member;
      (4) a held seat member having a generally straight held edge and an end edge and having generally planar upper and lower surfaces and formed with a first anchor bolt opening and integrally connected to said second side member along a second bend line and forming a generally 90° angle with said second side member;
      (5) a holding seat member having a generally planar upper surface in registration with said lower surface of said held seat member and formed with a second anchor bolt opening in registration with said first bolt opening integrally connected to said first side member along a rigid bend line and forming a generally 90° angle with said first side member; and
      (6) a bending slot having an upper end formed in said back member and said first side member along said lower end of said rigid corner bend line having a length no greater than 2.5 times said thickness of said dual side single element holdown connector as measured from said upper surface of said holding seat member to said upper end of said bending slot;
   e. an anchor bolt dimensioned for close registration with said first and second anchor bolt openings and extending therethrough into said anchoring means a selected distance;
   f. said generally straight held edge of said held seat member is in close engagement with a substantial portion of the length of said rigid bend line;

g. fastener means joining said back member to said wood stud member; and h. holding means releasably connected to said anchor bolt and positioned in registration with said generally planar upper surface of said held seat member.

5. A holdown connection comprising:

a. anchoring means having an upper planar surface;

b. a transfer means having an upper planar surface and a lower planar surface in registration with said upper planar surface of said anchoring means;

c. a wood stud member having a planar side face and a lower end in registration with said upper planar surface of said transfer means;

d. a dual side, single element stand off holdown connector formed from a single metal sheet member of a selected uniform thickness and formed by bending along substantially straight bend lines including:

(1) an elongated back member in registration with said planar side face of said wood stud member;

(2) a first side member integrally connected to said elongated back member along a rigid corner bend line having a lower end and forming a generally 90° angle with said elongated back member;

(3) a second side member integrally connected to said elongated back member along a first bend line and forming a generally 90° angle with said elongated back member;

(4) a held seat member having a generally straight held edge and an end edge and having generally planar upper and lower surfaces and formed with a first anchor bolt opening and integrally connected to said second side member along a second bend line and forming a generally 90° angle with said second side member;

(5) a holding seat member having a generally planar lower surface and a generally planar upper surface in registration with said lower surface of said held seat member and formed with a second anchor bolt opening in registration with said first bolt opening integrally connected to said first side member along a rigid bend line and forming a generally 90° angle with said first side member; and (6) a bending slot having an upper end formed in said back member and said first side member along said lower end of said rigid corner bend line having a length no greater than 2.5 times said thickness of said dual side, single element stand off holdown connector as measured from said upper surface of said holding seat member to said upper end of said bending slot;

(7) a foot member integrally connected to said elongated back member and extending to said upper planar surface of said transfer means;

e. an anchor bolt dimensioned for close registration with said first and second anchor bolt openings and extending therethrough into said anchoring means a selected distance;

f. said generally straight held edge of said held seat member is in close engagement with a substantial portion of the length of said rigid bend line;

g. fastener means joining said back member to said wood stud member; and h. holding means releasably connected to said anchor bolt and positioned in registration with said generally planar upper surface of said held seat member.

6. A holdown connection as described in claim 5 comprising:

a. said foot member is formed with a foot extension having an upper edge and is integrally connected to said foot member along a third bend line forming an angle therewith; and b. said upper edge of said foot extension is dimensioned and located in registration with said lower surface of said holding seat member.

7. A holdown connection as described in claim 6 wherein:

a. said elongated back member is formed with a plurality of bolt openings dimensioned for close fitting registration with said fastener means joining said back member to said wood stud member.

* * * * *